(12) United States Patent
Korchev et al.

(10) Patent No.: US 11,580,794 B2
(45) Date of Patent: Feb. 14, 2023

(54) ANOMALY PREDICTION AND DETECTION FOR AIRCRAFT EQUIPMENT

(71) Applicant: THE BOEING COMPANY, Chicago, IL (US)

(72) Inventors: Dmitriy Korchev, Irvine, CA (US); Charles E. Martin, Santa Monica, CA (US); Tsai-Ching Lu, Thousand Oaks, CA (US); Steve C. Slaughter, Scottsdale, AZ (US); Alice A. Murphy, Mesa, AZ (US); Derek Samuel Fok, Mesa, AS (US)

(73) Assignee: THE BOEING COMPANY, Arlington, VA (US)

( * ) Notice: Subject to any disclaimer, the term of this patent is extended or adjusted under 35 U.S.C. 154(b) by 408 days.

(21) Appl. No.: 16/843,220

(22) Filed: Apr. 8, 2020

(65) Prior Publication Data

US 2021/0319633 A1    Oct. 14, 2021

(51) Int. Cl.
*G07C 5/08* (2006.01)
*B64F 5/40* (2017.01)
*B64D 45/00* (2006.01)
*G07C 5/00* (2006.01)
*B64F 5/60* (2017.01)

(52) U.S. Cl.
CPC .......... *G07C 5/0808* (2013.01); *B64D 45/00* (2013.01); *B64F 5/60* (2017.01); *G07C 5/008* (2013.01); *B64D 2045/0085* (2013.01)

(58) Field of Classification Search
None
See application file for complete search history.

(56) References Cited

U.S. PATENT DOCUMENTS

| | | |
|---|---|---|
| 9,418,493 B1 | 8/2016 | Dong |
| 2009/0055145 A1 | 2/2009 | Volponi et al. |

(Continued)

FOREIGN PATENT DOCUMENTS

| | | | |
|---|---|---|---|
| CN | 110412966 A | | 11/2019 |
| CN | 114012966 A | * | 2/2022 |

(Continued)

OTHER PUBLICATIONS

Blei, D., "Bayesian Mixture Models and the Gibbs Sampler," Columbia University, , Oct. 19, 2015, pp. 1-10.

(Continued)

*Primary Examiner* — Abdhesh K Jha
(74) *Attorney, Agent, or Firm* — Moore IP Law

(57) ABSTRACT

A method includes obtaining sensor data captured by a sensor of an aircraft during a power up event. The sensor data includes multiple parameter values, each corresponding to a sample period. The method further includes determining a set of delta values, each indicating a difference between parameter values for consecutive sample periods of the sensor data. The method further includes determining a set of quantized delta values by assigning the delta values to quantization bins based on magnitudes of the delta values. The method further includes determining a normalized count of delta values for each quantization bin. The method further includes comparing the normalized counts of delta values to anomaly detection thresholds. The method further includes generating, based on the comparisons, output indicating whether the sensor data is indicative of an operational anomaly.

20 Claims, 8 Drawing Sheets

(56) References Cited

U.S. PATENT DOCUMENTS

2016/0107765 A1\* 4/2016 Dani .................. G05B 23/0251
   701/29.1
2017/0015434 A1\* 1/2017 McKay ................ G05D 1/0055

OTHER PUBLICATIONS

Mairal, Julien et al., "Online Learning for Matrix Factorization and Sparse Coding," Journal of Machine Learning Research vol. 11, 2020, pp. 19-60.
Ramanathan N. et al., Rapid Deployment with Confidence: Calibration and Fault Detection in Environmental Sensor Networks, Technical Reports 62, Center for Embedded Network Sensing, University of California, 2006, 15 pgs.
Ramanathan, N. et al., "Final Frontier: Embedding Networked Sensors in the Soil," Technical Reports 68, Center for Embedded Network Sensing, University of California, Jan. 1, 2006, 12 pgs.
Saybani, Mahmoud Reza et al., "Anomaly detection and prediction of sensors faults in a refinery using data minin techniques and fuzzy logic," Scientific Research and Essays vol. 6, No. 27, Nov. 16, 2011, pp. 5686-5695.
Sharma, Abhishek, B., et al., "Sensor Faults: Detection Methods and Prevalence in Real-World Datasets," AMC Transactions on Sensor Networks, vol. 6, No. 3, 2010, 3 pgs.
Subramaniam S. et al., "Online Outlier Detection in Sensor Data Using Non-Parametric Models," Proceedings of the 32nd International Conference on Very Large Data Bases, 2006, pp. 187-198.
Extended European Search Report for application No. 21150042.6 dated Jun. 28, 2021, 9 pgs.

\* cited by examiner

500

502
Obtain multiple sets of sensor data captured by on-board sensors of one or more aircraft during a plurality of power up events, each set of sensor data corresponding to a respective power up event of a respective aircraft and including multiple parameter values, each parameter value corresponding to a respective sample period during the respective power up event

504
Determine a set of Δ values for each set of sensor data, each Δ value from the set of Δ values indicating a difference between a first parameter value and a second parameter value from a pair of parameter values corresponding to consecutive sample periods from the set of sensor data

506
Determine a set of quantized Δ values by assigning Δ values of the set of Δ values to quantization bins based on magnitudes of the Δ values

508
Determine a normalized count of Δ values for each of the quantization bins

510
Set an anomaly detection threshold for each quantization bin based on the normalized counts of delta values and fault indication data associated with the one or more aircraft

FIG. 5

ANOMALY PREDICTION AND DETECTION FOR AIRCRAFT EQUIPMENT

This invention was made with Government support under contract number W911W6-15-2-0001 awarded by the Department of Defense. The government has certain rights in this invention.

FIELD OF THE DISCLOSURE

The present disclosure is generally related to anomaly prediction and detection for aircraft equipment.

BACKGROUND

Modern aircraft are extremely complex with many integrated systems that interact to provide features such as improved efficiency, improved safety, and improved performance. When any of these systems experiences a fault, significant time and resources can be expended to remedy the fault and prepare the aircraft for further operation. Additionally, performing unscheduled maintenance to remedy a fault condition can decrease operational availability of the aircraft. For example, parts, equipment, or technicians needed to perform unscheduled maintenance may not be available at the aircraft's location when the fault condition arises. In which case, the parts, equipment, or technicians may have to be transported to the aircraft, leading to significant delays.

Aircraft operators schedule many maintenance activities in an attempt to avoid this situation. Scheduled maintenance is performed according to a schedule at least partly with a goal to avoid the occurrence of faults. While scheduled maintenance may avoid many fault conditions, it is inefficient since components that appear to be operating normally (e.g., have not experienced a fault) are replaced.

SUMMARY

In a particular implementation, an aircraft includes a sensor configured to capture sensor data during a power up event. The sensor data includes multiple parameter values, and each parameter value corresponds to a respective sample period during the power up event. The aircraft also includes one or more processors and a memory device configured to store the sensor data and instructions that are executable by the one or more processors to detect operational anomalies for aircraft equipment associated with the sensor. The instructions, when executed by the one or more processors, cause the one or more processors to perform operations including determining a set of delta values. Each delta value from the set of delta values indicates a difference between a first parameter value and a second parameter value from a pair of parameter values corresponding to consecutive sample periods of the sensor data. The operations also include determining a set of quantized delta values by assigning delta values from the set of delta values to quantization bins based on magnitudes of the delta values. The operations further include determining a normalized count of delta values for each of the quantization bins. The operations also include performing a comparison of the normalized count of delta values for a particular quantization bin to an anomaly detection threshold of the particular quantization bin. The operations further include generating an output indicating, based on the comparison, whether the sensor data is indicative of an operational anomaly for the aircraft equipment.

In another particular implementation, a method includes obtaining, at a computing device, sensor data captured by a sensor of an aircraft during a power up event. The sensor data includes multiple parameter values, and each parameter value corresponds to a respective sample period during the power up event. The method also includes determining, by the computing device, a set of delta values. Each delta value from the set of delta values indicates a difference between a first parameter value and a second parameter value from a pair of parameter values corresponding to consecutive sample periods of the sensor data. The method further includes determining, by the computing device, a set of quantized delta values by assigning delta values from the set of delta values to quantization bins based on magnitudes of the delta values. The method also includes determining, by the computing device, a normalized count of delta values for each of the quantization bins. The method further includes performing, by the computing device, a comparison of the normalized count of delta values for a particular quantization bin to an anomaly detection threshold of the particular quantization bin. The method also includes generating, by the computing device and based on the comparison, an output indicating whether the sensor data is indicative of an operational anomaly for aircraft equipment associated with the sensor.

In another particular implementation, a non-transitory, computer-readable medium stores instructions that, when executed by a processor, cause the processor to initiate, perform, or control operations. The operations include obtaining sensor data captured by a sensor of an aircraft during a power up event. The sensor data includes multiple parameter values, and each parameter value corresponds to a respective sample period during the power up event. The operations also include determining a set of delta values. Each delta value from the set of delta values indicates a difference between a first parameter value and a second parameter value from a pair of parameter values corresponding to consecutive sample periods of the sensor data. The operations further include determining a set of quantized delta values by assigning delta values from the set of delta values to quantization bins based on magnitudes of the delta values. The operations also include determining a normalized count of delta values for each of the quantization bins. The operations further include performing a comparison of the normalized count of delta values for a particular quantization bin to an anomaly detection threshold of the particular quantization bin. The operations also include generating, based on the comparison, an output indicating whether the sensor data is indicative of an operational anomaly for aircraft equipment associated with the sensor.

In another particular implementation, a method of training an anomaly detection system includes obtaining, at a computing device, multiple sets of sensor data captured by on-board sensors of one or more aircraft during a plurality of power up events. Each set of sensor data corresponds to a respective power up event of a respective aircraft and includes multiple parameter values. Each parameter value corresponds to a respective sample period during the respective power up event. The method also includes determining, by the computing device, a set of delta values for each set of sensor data. Each delta value from the set of delta values indicates a difference between a first parameter value and a second parameter value from a pair of parameter values corresponding to consecutive sample periods from the set of sensor data. The method further includes determining, by the computing device, a set of quantized delta values by assigning delta values of the set of delta values to quantization bins based on magnitudes of the delta values. The method also includes determining, by the computing device, a normalized count of delta values for each of the quantization bins. The method further includes setting an anomaly detection threshold for each quantization bin based on the normalized counts of delta values and fault indication data associated with the one or more aircraft.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 5 is a flow chart of an example of a method of determining an anomaly detection threshold for the anomaly detection system of FIG. 1.

DETAILED DESCRIPTION

Figure 1:
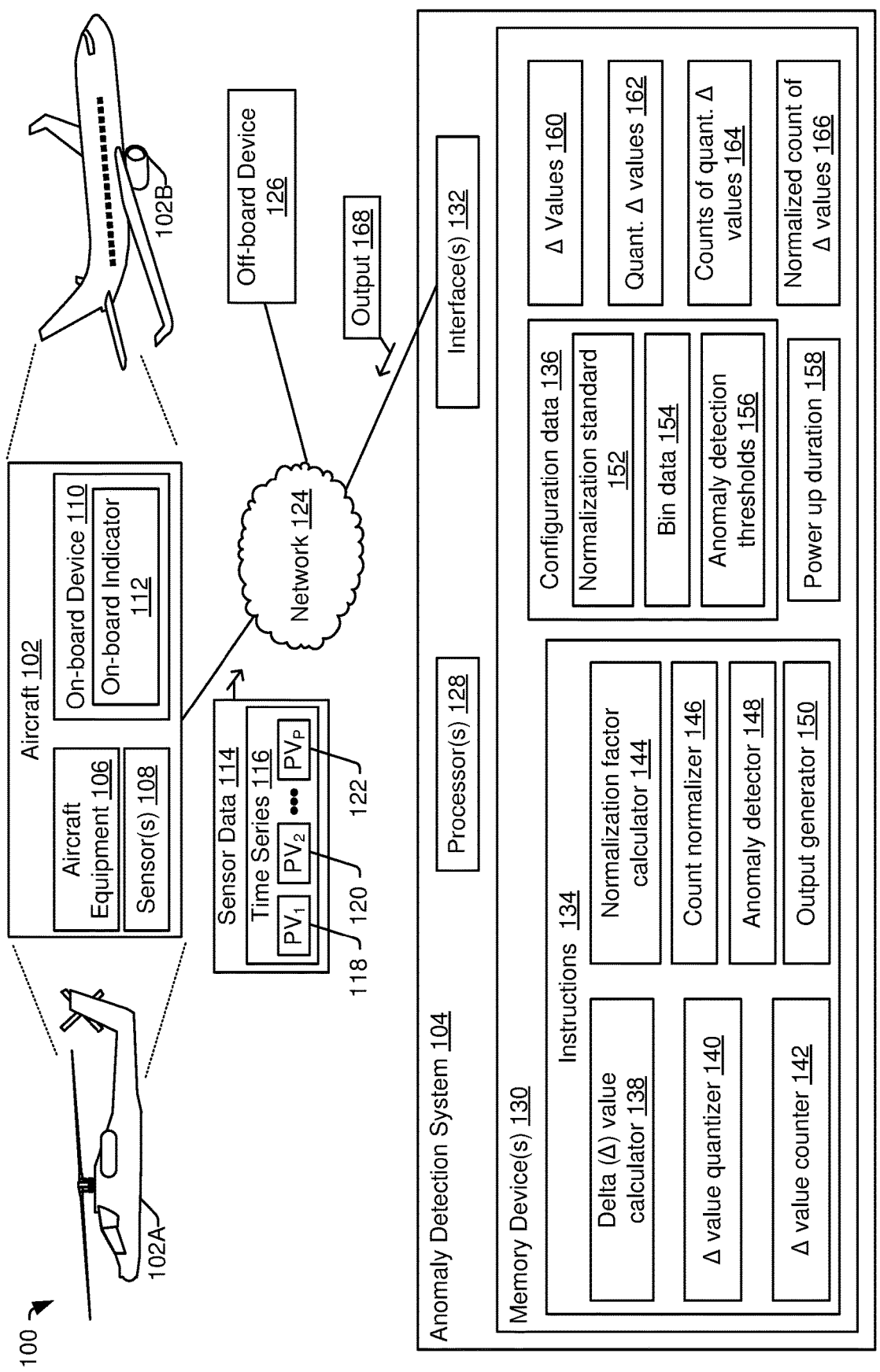
FIG. 1 is a diagram that illustrates an example of a system that includes one or more aircraft and an anomaly detection system.

The disclosed systems and methods enable detection of anomalous operation of aircraft equipment, which can occur before an actual fault condition is experienced. Detecting an anomaly before a fault condition occurs can enable aircraft operators to schedule maintenance more effectively and more efficiently. For example, rather than replacing a component based on flight hours (which can be wasteful if the component is not actually in need of replacement), the component can be replaced when an anomaly detection system indicates that the component will need replacement soon, but before the component experiences a fault. As a result, inefficiencies due to replacing components that are not in need of replacement and inefficiencies due to the aircraft experiencing a fault condition are both avoided or reduced.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 3, multiple examples of aircraft are also illustrated and associated with reference numbers 102A and 102K. When referring to a particular one of these aircraft a distinguishing letter is used. To illustrate, when referring to a first aircraft 102A, the distinguishing letter "A" is used. However, when referring to any arbitrary aircraft or to the aircraft as a group, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," "Kth," "Nth," "Pth," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device.

As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates an example of a system 100 that includes one or more aircraft 102 and an anomaly detection system 104. The aircraft 102 can be a rotary-wing aircraft 102A, a fixed-wing aircraft 102B, or another aircraft. The aircraft 102 includes aircraft equipment 106, such as one or more components of a propulsion system, one or more components of a hydraulic system, one or more components of an electrical system, one or more components of an environmental system, etc.

The aircraft 102 also includes one or more sensors 108 associated with the aircraft equipment 106. The sensor(s) 108 are configured to generate sensor data 114. The sensor data 114 includes a plurality of data samples of a time series 116. Each data sample indicates a corresponding parameter value of the time series 116. For example, in FIG. 1, the time series 116 of data samples includes a first parameter value 118 (labeled "$PV_1$"), a second parameter value 120 (labeled "$PV_2$"), and an Pth parameter value 122 (labeled "$PV_p$"). The first parameter value 118 corresponds to a value detected during a first sample period by a particular one of the sensors 108, the second parameter value 120 corresponds to a value detected during a second sample period by the particular one of the sensors 108, and the Pth parameter value 122 corresponds to a value detected during a Pth sample period by the particular one of the sensors 108 (where P is an integer greater than two). The sample periods are sequential. For example, the Pth sample period is subsequent to the second sample period, and the second sample period is subsequent to the first sample period. The time series 116 of data samples can also include one or more additional parameter values (e.g., between the second parameter value 120 and the Pth parameter value 122), which are not shown for convenience of illustration. The specific measurements or information represented by each of the parameter values 118-122 depends on the type of sensor 108 that generated the sensor data 114. For example, the parameter values 118-122 can indicate temperature, pressure, rotation rate, speed, location, humidity, vibration rate, or any other information associated with operation of or state of the aircraft equipment 106.

The sample periods of the time series 116 can be evenly spaced (e.g., periodic) or unevenly spaced (e.g., aperiodic). For example, one of the sensor(s) 108 may collect one data sample every 10 milliseconds, or at some other sampling rate, to generate evenly spaced data samples. As another example, one of the sensor(s) 108 may collect one data sample each time a state of the aircraft equipment 106 changes (or changes by a particular amount) to generate unevenly spaced data samples of the time series 116. As yet another example, one of the sensor(s) 108 may collect data samples at different sampling rates at different times, such as at a first sampling rate in flight and at a second sampling rate when powered up on the ground.

In some implementations, the sensor data 114 includes data samples from two or more of the sensor(s) 108. In such implementations, the sensor data 114 can include two or more time series 116 (e.g., one per sensor), and each of the two or more time series 116 can be evenly spaced or unevenly spaced. If two or more time series 116 are both evenly spaced, the sampling rates associated with the two or more time series 116 can be equal to one another (e.g., both sensors can have a sampling rate of 15 Hz), or the sampling rates associated with the two or more time series 116 can be unequal (e.g., one sensor can have a sampling rate of 15 Hz and the other sensor can have a sampling rate of 20 KHz).

In some implementations, in addition to the time series 116 of data samples indicating the parameter values 118-122, the sensor data 114 also includes metadata. For example, the sensor data 114 can include time index information (e.g., a time stamp or a sequence number) associated with the time series 116, a sensor identifier indicating which of the sensor(s) 108 generated the sensor data 114, or other information related to the sensor(s) 108, the sensor data 114, the aircraft 102, the aircraft equipment, or the time series 116. The sensor data 114 can be represented via digital signals or analog signals. For example, the sensor data 114 can be sent as one or more digitally encoded packets transmitted via a digital communication protocol. As another example, the sensor data 114 can be encoded in one or more analog electrical signals in which signal characteristics (such as amplitude, frequency, or phase) of the analog electrical signals represent the parameter values.

The sensor data 114 is provided to the anomaly detection system 104, which is configured to analyze the sensor data 114 to predict or detect operational anomalies associated with the aircraft equipment 106. In FIG. 1, the anomaly detection system 104 is illustrated as separate from the aircraft 102. For example, in FIG. 1, the anomaly detection system 104 and the aircraft 102 communicate via a network 124. However, in some implementations, the anomaly detection system 104 is integrated within the aircraft 102. For example, the anomaly detection system 104 can be included in a health monitoring system (such as a health monitoring system 816 illustrated in FIG. 8) of the aircraft 102.

In the example illustrated in FIG. 1, the anomaly detection system 104 includes, is included within, or corresponds to a computing device. For example, the anomaly detection system 104 includes one or more processors 128, one or more memory devices 130, and an interface 132 (such as a data port, wireless communication system, or another communication interface or input/output interface). The interface 132 is configured to receive the sensor data 114 and to send output 168 generated by the anomaly detection system 104 to an on-board device 110 of the aircraft 102, to an off-board device 126 (e.g., a maintenance computer system), or both. In other implementations, the anomaly detection system 104 is implemented using special-purpose circuitry (e.g., an application-specific integrated circuit), a programmed-field programmable gate array, or a combination of the above.

In the example illustrated in FIG. 1, the memory device(s) 130 store instructions 134 that are executable by the processor(s) 128 to analyze the sensor data 114 and generate the output 168. In the example illustrated in FIG. 1, the instructions 134 include various functional modules, including: a delta value calculator 138, a delta value quantizer 140, a delta value counter 142, a normalization factor calculator 144, a count normalizer 146, an anomaly detector 148, and an output generator 150. In the following description, the functional modules of the instructions 134 are described to illustrate one particular implementation of the anomaly detection system 104. In other implementations, the instructions 134 include more functional modules, fewer functional modules, or different functional modules. For example, in some implementations, two or more of the functional modules are combined in a single module. To illustrate, the delta value quantizer 140 and delta value counter 142 can be combined in a histogram generator (not shown). In another example, one or more of the functional modules can divided into two or more distinct modules. To illustrate, the anomaly detector 148 can be divided into two distinct anomaly detectors that use different detection thresholds, such as a first detection threshold to generate alerts sent to the off-board device 126 (e.g., maintenance alerts) and a second detection threshold to generate alerts sent to the on-board device 110 (e.g., aircrew alerts). In yet another example, in some implementations, one or more of the functions described below can be performed using dedicated hardware rather than software instructions. To illustrate, dedicated circuitry can be used to perform operations of the delta value calculator 138 by delaying a sample and subtracting the sample from a subsequent sample.

In the example illustrated in FIG. 1, the delta value calculator 138 is executable by the processor(s) 128 to determine delta values 160 based on the sensor data 114. Each of the delta values 160 corresponds to a difference between parameter values of two consecutive data samples of the time series 116. To illustrate, a first delta value ("$DV_1$") can be calculated using the equation $DV_1=PV_2-PV_1$, and a P–1th delta value ("$DV_{P-1}$") can be calculates as $DV_{P-1}=PV_P-PV_{P-1}$. In some implementations, the delta value calculator 138 ignores, drops, or eliminates the sign of each delta value 160. For example, the first delta value ($DV_1$) can be calculated using the equation $DV_1=|PV_2-PV_1|$. In this example, each delta value 160 represents a magnitude of the difference between adjacent parameter values of the time series 116.

The delta value quantizer 140 is executable by the processor(s) 128 to assign the delta values 160 into quantization bins (also referred to herein simply as "bins") to generate quantized delta values 162. Each bin represents a range of delta values, and the specific range of delta values represented by each bin and the number bins used for the sensor data 114 from each sensor 108 is indicated by bin data 154 in configuration data 136 stored in the memory device(s) 130. The bin data 154 is determined via a training process described with reference to FIGS. 3 and 5. In an example of assigning the delta values 160 into bins, the bin data 154 can specify evenly spaced bins with each bin corresponding to a delta value range of 5 units. In this example, if a particular delta value (e.g., the first delta value $DV_1$ from the example above) has a value of 4.5, the particular delta value is assigned to the first bin (corresponding to a range from 0 to 5 units), and if the particular delta value has a value of 32.1, the particular delta value is assigned to a seventh bin (corresponding to a range from 30 to 35 units).

In some implementations, the bin data 154 implicitly or explicitly specifies a difference threshold, and only delta values that satisfy the difference threshold are assigned to quantization bins. To illustrate, the bin data 154 can indicate that the first bin is to have a range from 0.5 to 6. In this illustrative example, delta values 160 less than 0.5 will not be assigned to a bin; thus, the difference threshold is 0.5. Alternatively, the delta value calculator 138 can drop or zero out delta values 160 that do not satisfy the different threshold.

The delta value counter 142 is executable by the processor(s) 128 to determine a count of the number of delta values 160 assigned to each bin to generate counts of the quantized delta values 164. The count of quantized delta values 164 for each bin indicates a number of times, during a particular power up event, that the sensor data 114 transitioned by a particular magnitude between two consecutive samples.

The number of delta values of a particular magnitude is expected to be higher for power up events of longer durations. In this context, a "power up event" refers to any instance in which an engine or auxiliary power unit of the aircraft 102 is operating and providing power to the aircraft equipment 106. The power up event ends when the engine or auxiliary power unit of the aircraft 102 ceases operating or ceases to provide power to the aircraft equipment 106. The duration of power up events of the aircraft 102 can vary significantly, e.g., from a few minutes for a quick test to several hours for a long flight. Longer duration power up events would typically be expected to have a higher count of quantized delta values 164 for any particular bin than would a shorter duration power up event. The anomaly detection system 104 normalizes the counts of quantized delta values 164 to a standard (e.g., the normalization standard 152) to ensure that comparisons with the anomaly detection thresholds 156 are meaningful. Normalization adjusts the count of quantized delta values 164 for each bin to an estimated value (e.g., a normalized count of delta values 166) corresponding to a standardized power up duration represented by a normalization standard 152 of the configuration data 136.

The normalization standard 152 indicates a benchmark duration of a standardized power up event or a number of data samples (e.g., a count of parameter values) that a respective sensor 108 will send during the standardized power up event. For example, if a particular sensor 108 has a sampling rate of 1 Hz and the duration of the standardized power up event is 90 minutes, then the normalization standard 152 for the particular sensor 108 can indicate that the standardized power up event has a duration of 90 minutes or can indicate that the standardized power up event corresponds to 5,400 samples (i.e., 1 sample/second*60 seconds/minute*90 minutes) from the particular sensor 108. For a sensor 108 that generates evenly spaced data samples, the power up event duration is equal to the normalization standard 152 divided by the sampling rate of the sensor 108; thus, for sensors 108 that generate evenly spaced data samples the normalization standard 152 can indicate either value. For a particular sensor 108 that generates unevenly spaced data samples, the duration of the standardized power up event is used as the normalization standard 152. Different sensors 108 can have different sampling rates or different sampling patterns (e.g., periodic or aperiodic). Thus, each sensor 108 used for anomaly detection can be associated with a respective normalization standard 152.

The duration of the standardized power up event is an arbitrary, specified value that is selected, for example, by a user associated with the anomaly detection system 104 during or before training the anomaly detector 148. As an example, the duration of the standardized power up event can be set based on an average duration of power up events associated with a set of aircraft 102.

The normalization factor calculator 144 is executable by the processor(s) 128 to determine a normalization factor based on the normalization standard 152 and information descriptive of the power up event (such as a power up duration 158) associated with the sensor data 114. For example, the normalization factor can be determined by dividing the power up duration 158 (or count of sample periods during a power up event) associated with the time series 116 by the duration of the standardized power up event (or a count of sample periods during the standardized power up event) indicated by the normalization standard 152.

The count normalizer 146 is executable by the processor(s) 128 to normalize the counts of quantized delta values 164 based on the normalization factor to generate normalized counts of quantized delta values 166 (also referred to herein as normalized counts of delta values or normalized counts). The normalized counts of quantized delta values 166 for a particular power up event include one normalized count for each bin for each sensor 108 that provides sensor data 114 to the anomaly detection system 104. The normalize count for a particular bin represents an estimate (e.g., an extrapolation) of how many delta values would be associated with the particular bin if the duration of the particular power up event had been equal to the duration of the standardized power up event.

The anomaly detector 148 is executable by the processor(s) 128 to compare each normalize count of delta values 166 to a respective anomaly detection threshold 156. If a normalized count of delta values 166 satisfies (e.g., is greater than or greater than or equal to) the respective anomaly detection threshold 156, the anomaly detector 148 causes the output generator 150 to generate the output 168 indicating that an anomaly has been detected. The anomaly detection thresholds 156 are established during a training process, such as the training process described with reference to FIGS. 3 and 5.

The anomaly detection thresholds 156 include one or more thresholds per bin per sensor 108 that provides sensor data 114 to the anomaly detection system 104. For example, in a particular implementation in which only one sensor 108 provides the sensor data 114 to the anomaly detection system 104, the anomaly detection thresholds 156 include one threshold per bin, and the anomaly detection system 104 detects an anomaly if the normalized count of delta values 166 for any bin satisfies the corresponding anomaly detection threshold 156. As another example, in a particular implementation in which only one sensor 108 provides the sensor data 114 to the anomaly detection system 104, the anomaly detection thresholds 156 include two thresholds (e.g., a first threshold and a second threshold) per bin. In this example, the anomaly detection system 104 detects a first type of anomaly if the normalized count of delta values 166 for any bin satisfies the corresponding first threshold and detects a second type of anomaly if the normalized count of delta values 166 for any bin satisfies the corresponding second threshold. To illustrate, the first threshold can be used to trigger a notification to the off-board device 126, and the second threshold can be used to trigger a notification to the on-board device 110.

As yet another example, in a particular implementation multiple sensors 108 provide respective sensor data 114 to the anomaly detection system 104, and the sensor data 114 from each sensor 108 is used to generate a respective normalized count of delta values 166. In this example, the anomaly detection thresholds 156 include one or more anomaly detection thresholds 156 for each bin of the normalized count of delta values 166 for each sensor 108. Thus, if twelve sensors 108 provide respective sensor data 114 to the anomaly detection system 104 resulting in twelve respective normalized count of delta values 166 with ten bins each, the anomaly detection thresholds 156 specify at least one hundred and twenty anomaly detection thresholds 156 (corresponding to twelve sensors×ten bins per sensor). The number of bins used to quantize delta values can be different for different sensors 108. For example, ten bins can be used to quantize the delta values 160 associated with sensor data 114 from a first sensor, and seven bins (or another number greater than or less than ten) can be used to quantize the delta values 160 associated with sensor data 114 from a second sensor. Also, some sensors 108 can be associated with a single anomaly detection threshold per bin, and other sensors 108 can be associated with two or more anomaly detection thresholds per bin.

In some implementations, the anomaly detection thresholds 156 include two more different thresholds per bin per sensor, and the particular thresholds used depend on conditions present during the power up event. For example, the anomaly detection system 104 can receive data identifying the conditions present during the power up event from one or more of the sensors 108, from a user (e.g., via the on-board device 110), or from another device (e.g., the off-board device 126). In this example, the anomaly detection system 104 can select a particular anomaly detection threshold 156 for each bin and each sensor 108, based on the data identifying the conditions present during the power up event. To illustrate, an environmental control system of the aircraft 102 can operate differently depending on ambient environmental conditions, such as ambient temperature, ambient humidity, ambient pressure, etc. In this illustrative example, the anomaly detection thresholds 156 can include, for example, a first set of thresholds that are to be used when relatively hot weather conditions are present and a second set of thresholds that are to be used when relatively cold weather conditions are present. In this illustrative example, the anomaly detection system 104 can select to use the first set of thresholds or the second set of thresholds based on user input (e.g., via the on-board device 110), based on weather data (e.g., from the off-board device 126), or based on sensor data 114 from one of the sensors 108 (e.g., an ambient temperature sensor).

In a particular implementation, some sensors 108 experience many relatively small variations during normal operating conditions (e.g., when no fault is imminent). In such implementations, some bins of the normalized counts of delta values 166 may not be associated with an anomaly detection threshold 156. For example, if normal operation of the aircraft equipment 106 monitored by a particular sensor 108 is associated with sample-to-sample variation of up to 5-10 units (e.g., delta values of 5-10 units), one or more bins associated with delta values of 0 to 10 units are not associated with a corresponding anomaly detection threshold 156.

When an operational anomaly is detected by the anomaly detector 148, the output generator 150 generates the output 168. The output 168 can include an anomaly notification message, a signal (e.g., a voltage or current) provided to an on-board indicator 112, etc. In some implementations, the output 168 can include details of the detected anomaly, such as an identification of the aircraft equipment 106 associated with the anomaly, an identification of the sensor 108 that generated the sensor data 114, a sample of the sensor data 114, a summary of the sensor data 114, a tag or other identifier associated with the anomaly detection threshold 156 that was satisfied, etc.

The output 168 is sent to the on-board device 110, to an off-board device 126, or both. For example, the output 168 can be sent to on-board device 110 to cause the on-board indicator 112 to notify a crew member (e.g., an aircrew or groundcrew member) of the operational anomaly. As another example, the off-board device 126 can include or correspond to a maintenance computing device or ground operations computing device. In this example, the output 168 can cause the off-board device 126 to notify ground or maintenance crew of the operational anomaly or to automatically schedule one or more maintenance activities based on the operational anomaly.

By detecting the operational anomaly before a fault condition occurs, the anomaly detection system 104 enables an operator of the aircraft 102 to schedule maintenance for the aircraft 102 more effectively and more efficiently. In addition, the anomaly detection system 104 uses a computationally efficient process, similar to generating a histogram, to detect anomalies. For many sensor data streams, large variations during a short period are unusual and can be indicative of impending fault conditions. To illustrate, in an environmental control system, a number of relatively small variations from time-to-time in compressor outlet pressure are typical and expected. However, a similar number of large variations in the compressor outlet pressure over the same time period can indicate that the compressor (or a pressure sensor) is beginning to experience conditions that generally lead to a fault. To illustrate, such wide variations can indicate that the compressor is having difficulty starting rotation of an impeller, which can indicate the initial stages of a bearing failure. Using the computationally efficient calculations and counting operations described above, the anomaly detection system 104 can generate histogram-like data (e.g., the normalized count of delta values 166) and use the histogram-like data to determine whether the sensor data 114 includes concerning variations, such as too many (e.g., at least a threshold number) changes of a particular magnitude (e.g., in a particular bin). The use of histogram-like data also allows the anomaly detection system 104 to consider many different ranges of variations in the sensor data 114 and corresponding thresholds. For example, while a small number of "large" delta values 160 may indicate an anomaly, in some instances, an anomaly can also (or in the alternative) be indicated by a larger number of "medium" sized delta value 160. To illustrate, in some implementations, 25 compressor outlet pressure delta values in the range of 20-30 pound per square inch (psi) may be just as concerning as 4 compressor outlet pressure delta values in the range of 40-50 psi over the same time period. Using the histogram-like data described above enables the anomaly detection system 104 to efficiently detect either condition, as well as others.

Figure 2:
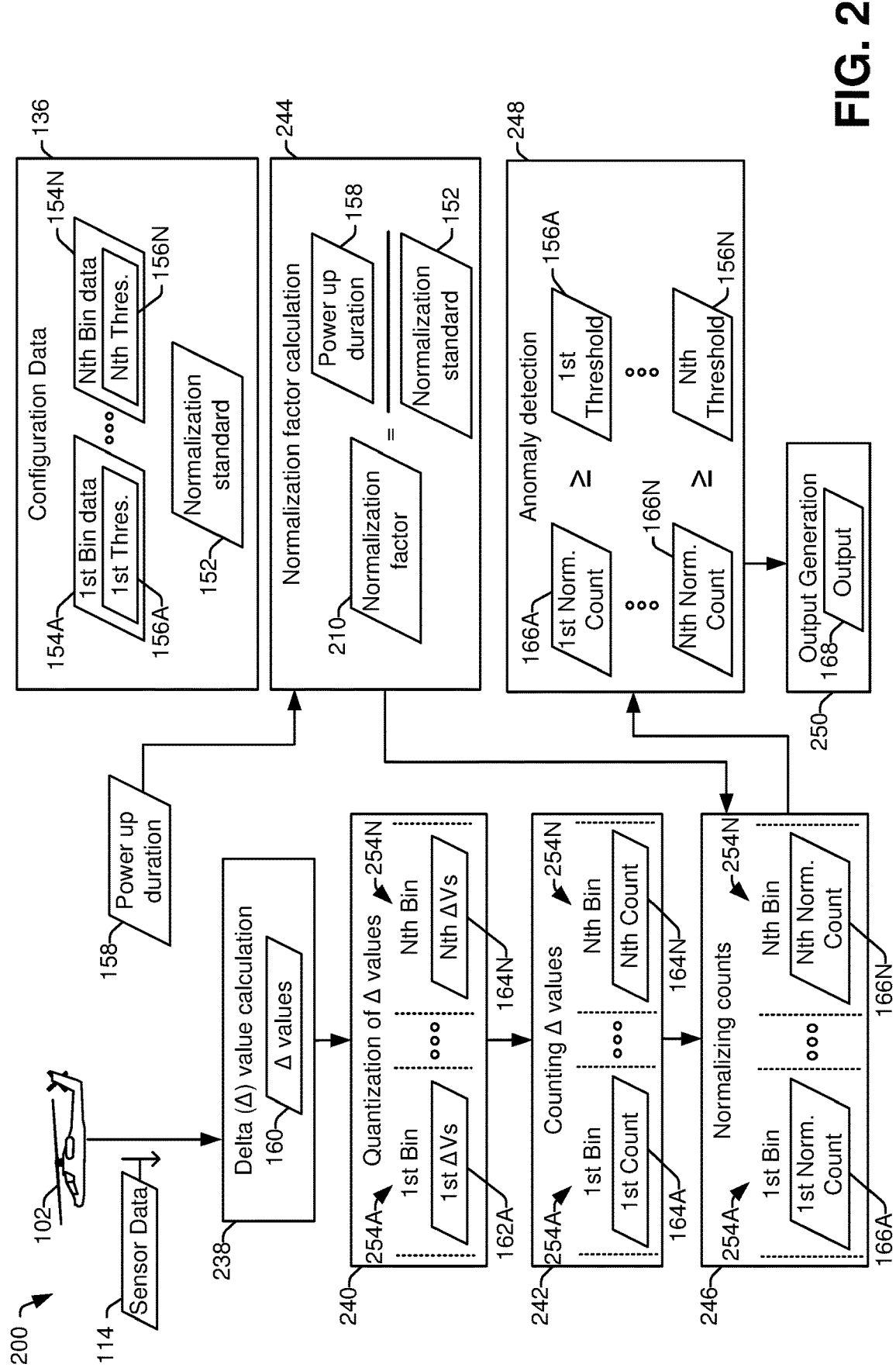
FIG. 2 is a diagram that illustrates details of operations performed by the anomaly detection system of FIG. 1 to detect an anomaly based on sensor data.

FIG. 2 is a diagram that illustrates details of operations 200 performed by the anomaly detection system 104 of FIG. 1 to detect an anomaly based on the sensor data 114. In a particular implementation, the operations 200 described with reference to FIG. 2 are performed by the one or more processors 128 of FIG. 1 executing the functional modules of the instructions 134 in accordance with the configuration data 136. The operations 200 are performed during or after a power up event of the aircraft 102.

In FIG. 2, a delta value calculation operation 238 generates the delta values 160 based on the sensor data 114. For example, the delta value calculation operation 238 determines the delta values 160 by calculating a difference, or an absolute value of the difference, between parameter value indicated by each pair of consecutive data samples of the sensor data 114. Thus, each delta value 160 indicates how much a measured parameter varied from one sample period to the next sample period of the sensor data 114.

In FIG. 2, a quantization of delta values operation 240 assigns each of the delta values 160 to a quantization bin 254 based on a magnitude of the respective delta value 160. For example, in FIG. 2, a first set of the delta values 160 have magnitudes within a range associated with a first bin 254A and are assigned to the first bin 254A as a first set of quantized delta values 162A. Likewise, an Nth set of the delta values 160 have magnitudes within a range associated with an Nth bin 254N and are assigned to the Nth bin 254N as an Nth set of quantized delta values 162N (where N is an integer greater than one). The number of bins 254 used, the range associated with each bin 254, or other information descriptive of the bins 254 is indicated in the bin data 154. For example, first bin data 154A indicates a range of magnitudes associated with the first bin 254A and Nth bin data 154N indicates a range of magnitudes associated with the Nth bin 254N.

In FIG. 2, a count of delta values operation 242 counts the number of delta values 160 assigned to each bin 254. For example, the count of delta values operation 242 counts the number of delta values 160 in the first set of quantized delta values 162A to determine a first count 164A. Likewise, the count of delta values operation 242 counts the number of delta values 160 in the Nth set of quantized delta values 162N to determine an Nth count 164N.

In FIG. 2, a normalizing counts operation 246 determines normalized counts of the quantized delta values 164 using the normalization factor 210. For example, the first count 164A associated with the first bin 254A is multiplied by the normalization factor 210 to determine a first normalized count 166A associated with the first bin 254A. Likewise, the Nth count 164N associated with the Nth bin 254N is multiplied by the normalization factor 210 to determine an Nth normalized count 166N associated with the Nth bin 254N. The normalization factor 210 is determined by a normalization factor operation 244 based on the power up duration 158 and the normalization standard 152. For example, in the implementation illustrated in FIG. 2, the normalization factor 210 is equal to the power up duration 158 divided by the normalization standard 152.

In FIG. 2, an anomaly detection operation 248 compares one or more of the normalized counts of delta values 166 to one or more corresponding thresholds 156 to determine whether an anomalous condition is indicated. For example, the first normalized count 166A is compared to a first threshold 156A associated with the first bin 254A. Likewise, the Nth normalized count 166N is compared to an Nth threshold 156N associated with the Nth bin 254N. As described with reference to FIG. 1, in some implementations, one or more of the bins 254 is not associated with a threshold 156. For example, if any number of delta values 160 within the range of delta values associated with a particular bin is acceptable (e.g., not indicative of an impending fault condition) then the particular bin is not associated with a threshold 156. Further, as described with reference to FIG. 1, in some implementations, one or more of the bins 254 is associated with more than one threshold 156. For example, a particular bin 254 can be associated with a first threshold (e.g., a lower threshold) and a second threshold (e.g., a higher threshold), and the output 168 generated can depend on the particular threshold(s) that are satisfied. As another example, a particular bin 254 can be associated with multiple thresholds, and the particular threshold(s) 156 used by the anomaly detection operation 248 depends on conditions associated with the power up event of the aircraft 102, such as whether the aircraft flies during the power up event, ambient environmental conditions associated with the power up event, or specific functions or equipment operated during the power up event, etc.

In FIG. 2, an output generation operation 250 generates the output 168 based on the comparison(s) performed by the anomaly detection operation 248. For example, the specific content of the output 168, where the output 168 is sent, or both, can be selected by the output generation operation 250 depending on which one or more of the thresholds 156 were satisfied. In some implementations, the output 168 indicates that no anomaly is detecting in response to none of the thresholds 156 being satisfied.

Figure 3:
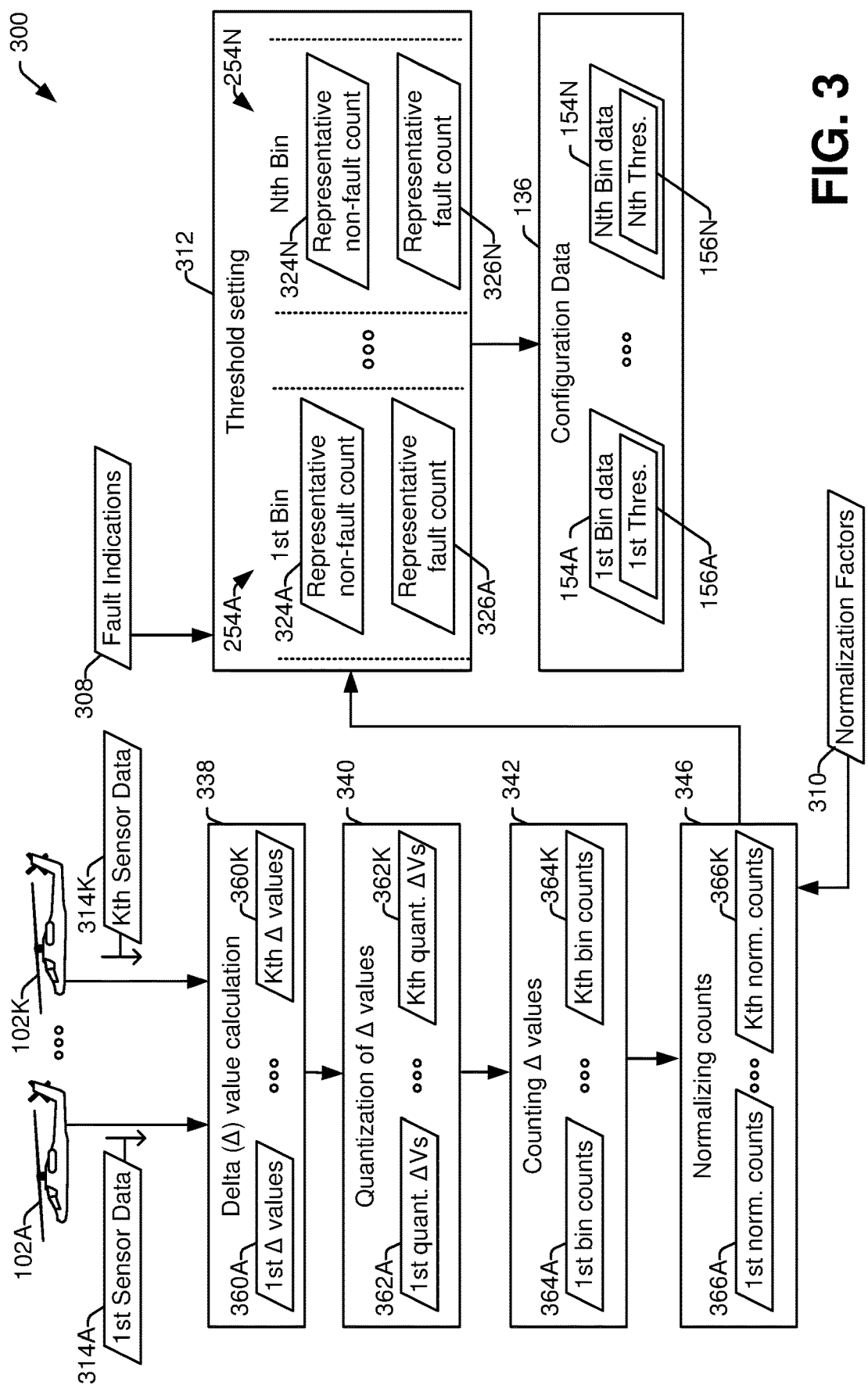
FIG. 3 is a diagram that illustrates details of operations performed to train the anomaly detection system of FIG. 1.

FIG. 3 is a diagram that illustrates details of operations performed to train the anomaly detection system 104 of FIG. 1. In a particular implementation, the operations 300 described with reference to FIG. 3 are performed by the one or more processors 128 of FIG. 1 during training of the anomaly detection system 104 to generate at least a portion of the configuration data 136. In other implementations, the operations 300 described with reference to FIG. 3 are performed by another device that is distinct from the anomaly detection system 104, such as a distinct computing device. In such implementations, the other device sends at least a portion of the configuration data 136 to the anomaly detection system 104 or the anomaly detection system 104 retrieves the at least a portion of the configuration data 136 from the other device.

The anomaly detection system 104 is trained based on sensor data 314 from multiple power up events of one or more aircraft 102. In contrast to the sensor data 114 of FIGS. 1 and 2, which represents a single power up event for a particular aircraft 102, the sensor data 314 represents multiple historical power up events. For example, in FIG. 3, a first set of sensor data 314A is generated during a power up event of a first aircraft 102A, and a Kth set of sensor data 314K is generated during a power up event of a Kth aircraft 102K, where K is an integer greater than one. In some implementations, one or more additional sets of sensor data 314 are generated during power up events of one or more other aircraft 102. In some implementations, the multiple sets of the sensor data 314 are generated by a single aircraft 102 over multiple power up events.

In FIG. 3, a delta value calculation operation 338 generates a set of delta values 360 for each set of sensor data 314. For example, the delta value calculation operation 338 determines a first set of delta values 360A by calculating a difference, or an absolute value of the difference, between parameter values indicated by each pair of consecutive data samples of the first set of sensor data 314A. Likewise, the delta value calculation operation 338 determines a Kth set of delta values 360K by calculating a difference, or an absolute value of the difference, between parameter values indicated by each pair of consecutive data samples of the Kth set of sensor data 314K.

In FIG. 3, a quantization of delta values operation 340 assigns the delta values of each set of delta values 360 to quantization bins 254 based on a magnitude of the respective delta values. For example, in FIG. 3, the first set of the delta values 360A are assigned to the bin 254 to generate a first set of quantized delta values 362A. Likewise, the Kth set of the delta values 360K are assigned to the bins 254 to generate a Kth set of quantized delta values 362K (where K is an integer greater than one).

The number of bins 254 used, the range associated with each bin 254, or other information descriptive of the bins 254 is determined based on a range of values associated with the sets of delta values 360 or based on a range of parameter values indicated by the respective set of sensor data 314 or associated with the type(s) of sensor that generated the respective set of sensor data 314. For example, the number of bins 254 used for a particular set of sensor data 314 can be specified by a user, can be a default value, can be selected based on a heuristic, or can be optimized or determined based on the training process to provide specified detection characteristics for the anomaly detection system 104. Generally, the bins 254 represent equally-sized ranges. For example, if a first bin 254 represents a range of 5 units then the other bins 254 also represent a range of 5 units each.

When the number of bins 254 to be used is known, the range of each bin 254 can be determined by dividing the magnitude of the largest delta value of the sets of delta values 360 by the number of bins 254. In some implementations, a safety margin can be added to the magnitude of the largest delta value to ensure that the aggregate range of the bins 254 includes all likely delta values. Alternatively, if the sensor data 314 indicates a fault condition when a delta value of a particular magnitude is detected, then a magnitude less than the particular magnitude can be used as the largest delta value to divide up the bins 254.

If the number of bins 254 to be used is not known or specified in advance, the number of bins 254 can be selected arbitrarily or randomly during a first training iteration, and can be updated (if needed) during a subsequent iteration of training to improve accuracy of the anomaly detection system 104. To illustrate, the anomaly detection system 104 can be trained using a set of training data (e.g., the sets of sensor data 314 and fault indication data 308 associated with the aircraft 102 that generated the sensor data 314) and with a first number of bins 254. In this illustrative example, the fault indication data 308 indicates whether each particular aircraft 102 experienced a fault condition after the power up event associated with the sensor data 314 (e.g., within a particular number of subsequent power up events). Thus, the fault indication data 308 acts as a label (for supervised training) to indicate whether each set of sensor data 314 is associated with a future fault condition. Continuing the illustrative example, after the anomaly detection system 104 is trained using a first set of training data and the first number of bins 254, the anomaly detection system 104 can be tested using a set of test data to determine whether the anomaly detection system 104 is able to accurately predict which sensor data from the set of test data is indicative of a future fault condition. If the testing indicates that anomaly detection system 104 satisfies specified acceptance criteria (e.g., is sufficiently accurate, generates an acceptably low rate of false positives, generates an acceptably low rate of false negatives, etc.), then the anomaly detection system 104 can be released for use with the first number of bins 254. However, if the testing indicates that anomaly detection system 104 fails to satisfy the specified acceptance criteria, then the anomaly detection system 104 can be retrained and retested using a second number of bins 254.

In FIG. 3, a counting of delta values operation 342 counts the number of delta values assigned to each bin 254. For example, the count of delta values operation 342 counts the number of delta values of the first set of quantized delta values 362A that are assigned to each of the bins 254 to determine first bin counts 364A and counts the number of delta values of the Kth set of quantized delta values 362K that are assigned to each of the bins 254 to determine Kth bin counts 364K.

In FIG. 3, a normalizing counts operation 346 determines normalized counts 366 based on the bin counts 364 and normalization factors 310. The normalization factors 310 include one normalization factor for each set of sensor data 314. Put another way, there are K normalization factors 310, which correspond to the K sets of sensor data 314. Each normalization factor 310 is equal to a power up duration associated with the set of sensor data 314 divided by a normalization standard. The normalization standard is an arbitrary standardized power up duration or a representative power up duration, such as an average power up duration associated with all of the power up events in which the sets of sensor data 314 were generated.

In FIG. 3, a threshold setting operation 312 generates, for each bin 254, one or more representative counts based on the normalized counts 366. In the example illustrated in FIG. 3, the threshold setting operation 312 identifies for each bin 254 a representative fault count 326 based on the aggregate bin count (or the average aggregate bin count) associated with the bin 254 and the fault indication data 308. For example, the threshold setting operation 312 identifies a first representative fault count 326A for the first bin 254A. The first representative fault count 326A indicates a value of the normalized count 366 for the first bin 254A that is likely to be indicative of an imminent fault condition. In this example, the representative fault count 326A can be determined by a machine learning process, such as a support vector machine, that uses the sets of normalized counts 366 and the fault indications 310 as training data to identify, for each bin 254, a boundary between the normalized count 366 that is not indicative of an impending fault and the normalized count 366 that is indicative of an impending fault. In other examples, statistical or heuristic processes can be used to identify, for each bin, a boundary between a normalized count 366 that is not indicative of an impending fault and a normalized count 366 that is indicative of an impending fault. In some implementations, the threshold setting operation 312 also identifies, for each bin 254, a representative non-fault count 324 using a similar process. The representative non-fault count 324 indicates a value of the normalized count 366 for the respective bin 254 that is likely not indicative of an imminent fault condition.

In some implementations, the representative fault count 326 associated with each bin 254 is set as the anomaly detection threshold 156 for the respective bin 254. For example, the representative fault count 326A associated with the first bin 254A is stored in the configuration data 136 as the first anomaly detection threshold 156A associated with the first bin data 154A, and the representative fault count 326N associated with the Nth bin 254N is stored in the configuration data 136 as the Nth anomaly detection threshold 156N associated with the Nth bin data 154N.

As describe above, the anomaly detection system 104 can use more than one anomaly detection threshold for each bin 254. In a particular implementation, the threshold setting operation 312 uses the representative fault count 326 associated with each bin 254 to set a higher anomaly detection threshold 156 for the respective bin 254 and uses the representative non-fault count 324 associated with the bin 254 to set a lower anomaly detection threshold 156 for the bin 254. Alternatively, the lower anomaly detection threshold for each bin 254 can be set based on an offset from the representative fault count 326 (e.g., the representative fault count 326 minus a particular value, which can be arbitrary or can be based on statistics associated with the sets of sensor data 314). In another alternative, the representative fault count 326 can be an average of the lowest normalized counts 366 that were associated with fault conditions, and the lower and upper anomaly detection thresholds can be set based on confidence intervals or statistical variance of the normalized counts 366.

After the anomaly detection thresholds 156 are established, the configuration data 136 can be used by the anomaly detection system 104 of FIG. 1 to detect anomaly conditions associated with power up events of the aircraft 102.

Figure 4:
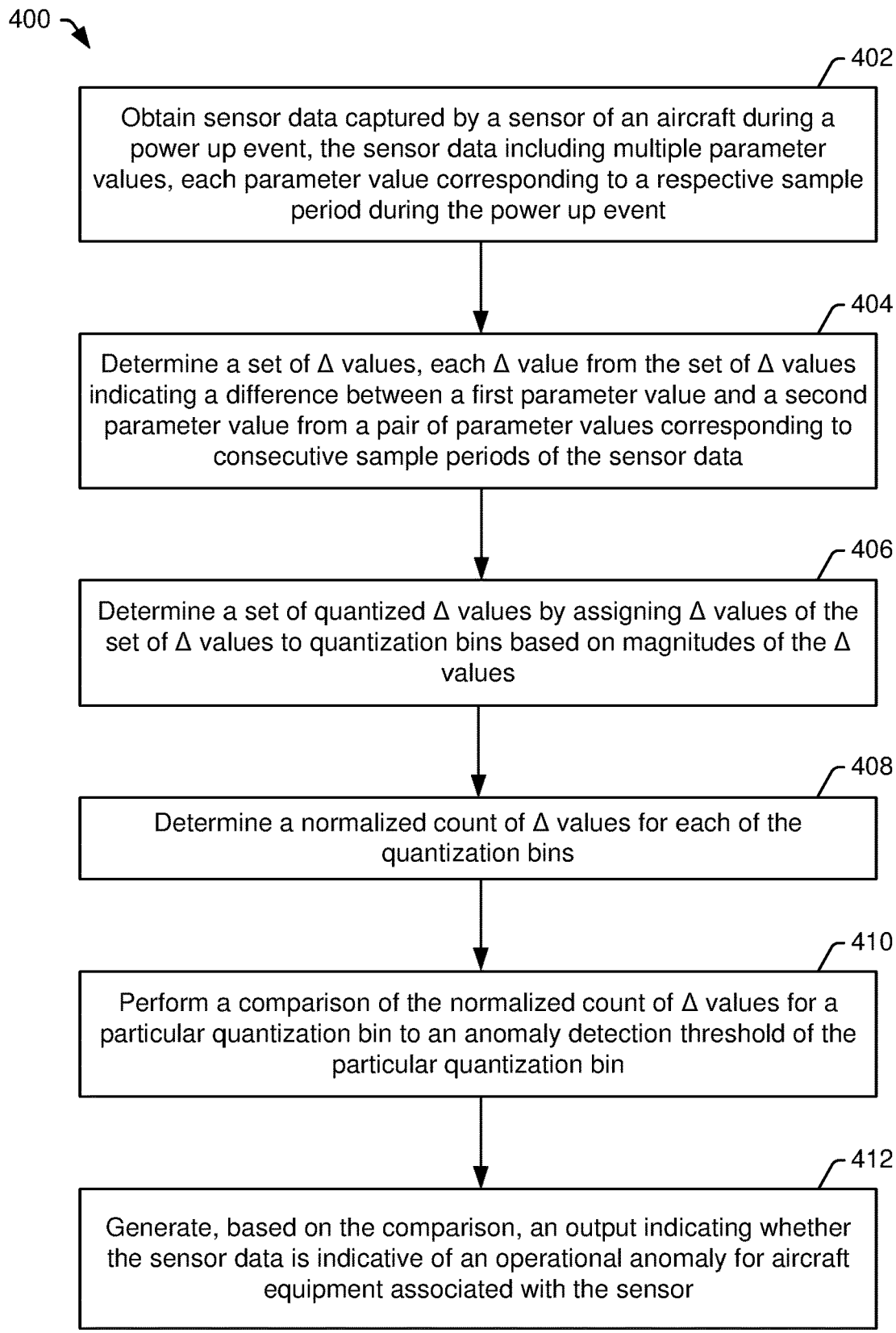
FIG. 4 is a flow chart of an example of a method of detecting an anomaly using the anomaly detection system of FIG. 1.

FIG. 4 is a flow chart of an example of method 400 of detecting an anomaly using the anomaly detection system 104 of FIG. 1. In a particular implementation, the method 400 is initiated, controlled, or performed by the processor(s) 128 of FIG. 1.

The method 400 includes, at 402, obtaining, at a computing device, sensor data captured by a sensor of an aircraft during a power up event. As a particular example, the anomaly detection system 104 of FIG. 1 receives the sensor data 114, which is generated by one or more sensors 108 of the aircraft 102. The sensor data 114 includes multiple parameter values (e.g., $PV_1$ 118, $PV_2$ 120, and $PV_P$ 122), and each parameter value corresponds to a respective sample period during the power up event.

The method 400 also includes, at 404, determining, by the computing device, a set of delta values. As a particular example, the delta value calculator 138 of FIG. 1 calculates the delta values 160. Each delta value from the set of delta values indicating a difference between a first parameter value and a second parameter value from a pair of parameter values corresponding to consecutive sample periods of the sensor data.

The method 400 further includes, at 406, determining, by the computing device, a set of quantized delta values by assigning delta values of the set of delta values to quantization bins based on magnitudes of the delta values. As a particular example, the delta value quantizer 140 of FIG. 1 assigns each delta value 160 to a quantization bin 254 based on a magnitude of the delta value 160 to generate the counts of quantized delta values 164.

The method 400 also includes, at 408, determining, by the computing device, a normalized count of delta values for each of the quantization bins. As a particular example, the count normalizer 146 of FIG. 1 determines the normalized count of delta values for each of the quantization bins 254. To illustrate, the count normalizer 146 multiples each the count of quantized delta values 164 for each quantization bin 254 by the normalization factor 210.

The method 400 further includes, at 410, performing, by the computing device, a comparison of the normalized count of delta values for a particular quantization bin to an anomaly detection threshold of the particular quantization bin. As a particular example, the anomaly detector 148 of FIG. 1 compares the normalized count of delta values 166 for a particular quantization bin 254 to the anomaly detection threshold 156 of the particular quantization bin 254. In some implementations, multiple anomaly detection thresholds 156 are associated with some quantization bins 254. In such implementations, the normalized count of delta values 166 is compared to each of the anomaly detection threshold 156. Alternatively, in such implementations, one of the anomaly detection thresholds 156 for a particular quantization bin 254 is selected (e.g., based on conditions associated with the power up event), and the normalized count of delta values 166 for the particular quantization bin 254 is compared to the selected anomaly detection threshold 156.

The method 400 also includes, at 412, generating, by the computing device and based on the comparison, an output indicating whether the sensor data is indicative of an operational anomaly for aircraft equipment associated with the sensor. As a particular example, the output generator 150 of FIG. 1 generates the output 168, which indicates whether an operational anomaly is detected in the sensor data 114.

The method 400 is a computationally efficient process to detect an operational anomaly before a fault condition occurs. Thus, the method 400 enables aircraft operators and maintainers to schedule maintenance more effectively and more efficiently.

FIG. 5 is a flow chart of an example of method 500 of determining an anomaly detection threshold for the anomaly detection system 104 of FIG. 1. In a particular implementation, the method 500 is initiated, controlled, or performed by the processor(s) 128 of FIG. 1. In other implementations, the method 500 is performed by a computing device that is distinct from the anomaly detection system 104 (such as the off-board device 126), and the anomaly detection thresholds (and perhaps other configuration data) are subsequently provided to the anomaly detection system 104.

The method 500 includes, at 502, obtaining, at a computing device, multiple sets of sensor data captured by on-board sensors of one or more aircraft during a plurality of power up events. Each set of sensor data corresponds to a respective power up event of a respective aircraft and includes multiple parameter values. Each parameter value corresponds to a respective sample period during the respective power up event.

The method 500 also includes, at 504, determining, by the computing device, a set of delta values for each set of sensor data. Each delta value from the set of delta values indicates a difference between a first parameter value and a second parameter value from a pair of parameter values corresponding to consecutive sample periods from the set of sensor data. For example, the computing device can perform one or more delta value calculation operations 338 as described with reference to FIG. 3.

The method 500 further includes, at 506, determining, by the computing device, a set of quantized delta values by assigning delta values of the set of delta values to quantization bins based on magnitudes of the delta values. For example, the computing device can perform one or more quantization of delta values operations 340 as described with reference to FIG. 3.

The method 500 also includes, at 508, determining, by the computing device, a normalized count of delta values for each of the quantization bins. For example, the computing device can perform one or more counting of delta values operations 342 and normalizing counts operations 346 as described with reference to FIG. 3.

The method 500 further includes, at 510, setting an anomaly detection threshold for each quantization bin based on the normalized counts of delta values and fault indication data associated with the one or more aircraft. For example, the computing device can perform one or more threshold setting operations 312 as described with reference to FIG. 3.

Figure 6:
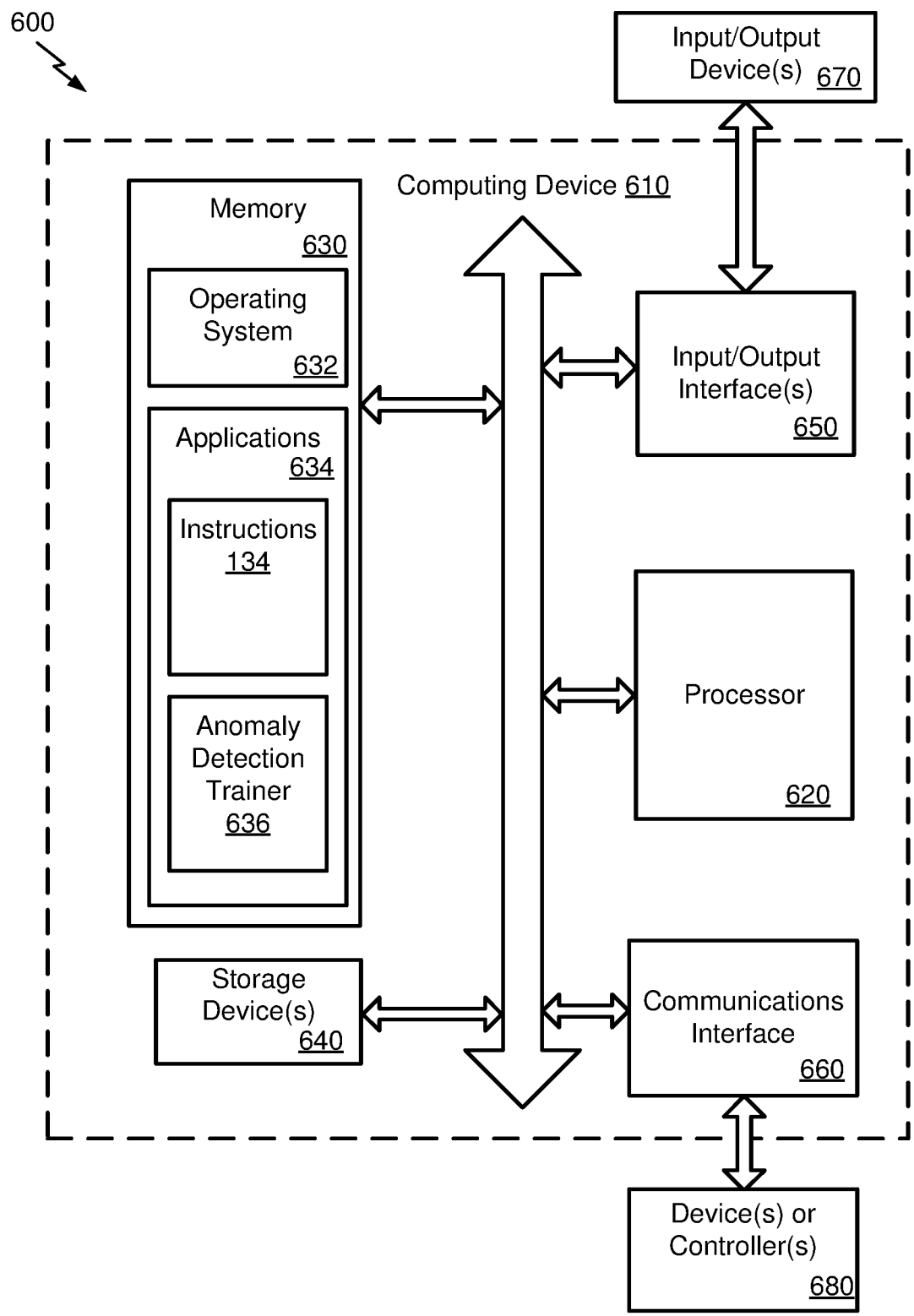
FIG. 6 is a block diagram of a computing environment including a computing device configured to support aspects of computer-implemented methods and computer-executable program instructions (or code) according to the present disclosure.

FIG. 6 is a block diagram of a computing environment 600 including a computing device 610 configured to support aspects of computer-implemented methods and computer-executable program instructions (or code) according to the present disclosure. As a particular example, the computing device 610 includes, is included within, or corresponds to the anomaly detection system 104 of FIG. 1. As another particular example, the computing device 610 includes, is included within, or corresponds to the off-board device 126 or the on-board device 110 of FIG. 1. The computing device 610, or portions thereof, is configured to execute instructions to initiate, perform, or control one or more operations described with reference to FIGS. 1-5. For example, in some implementations, the computing device 610 includes components configured to perform the operations of the method 400 of FIG. 4, the method 500 of FIG. 5, or both. To illustrate, in FIG. 6, the computing device 610 includes the instructions 134 of FIG. 1, which are executable to perform anomaly detection based on sensor data. In another illustrative example, in FIG. 6, the computing device 610 includes an anomaly detection trainer 636, which corresponds to instructions that are executable to perform the operations 300, the method 500, or both.

The computing device 610 includes one or more processors 620. The processor(s) 620 are configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 also stores applications, such as the instructions 134, the anomaly detection trainer 636, or both.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the configuration data 136 of FIGS. 1-3). In a particular aspect, the system memory 630, the storage devices 640, or both, include tangible computer-readable media. In a particular aspect, one or more of the storage devices 640 are external to the computing device 610.

The one or more input/output interfaces 650 enable the computing device 610 to communicate with one or more input/output devices 670 to facilitate user interaction. For example, the one or more input/output interfaces 650 can include a display interface, an input interface, or both. The processor(s) 620 are configured to communicate with devices or controllers 680 via the one or more communications interfaces 660. For example, the one or more communications interfaces 660 can include a network interface. The devices or controllers 680 can include, for example, the aircraft 102, a device of the network 124, the sensor(s) 108, the on-board device 110, the off-board device 126, or any combination thereof.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-5. To illustrate, the instructions of the applications 634, when executed by the processor(s) 620, can cause the processor(s) 620 to initiate, perform, or control operations to train an anomaly detection system 104, to detect anomalies based on sensor data 114, or both. In some implementations, part or all of one or more of the operations or methods of FIGS. 1-5 are implemented by one or more processors (e.g., one or more central processing units (CPUs), one or more graphics processing units (GPUs), one or more digital signal processors (DSPs)) executing instructions, by dedicated hardware circuitry, or any combination thereof.

Figure 7:
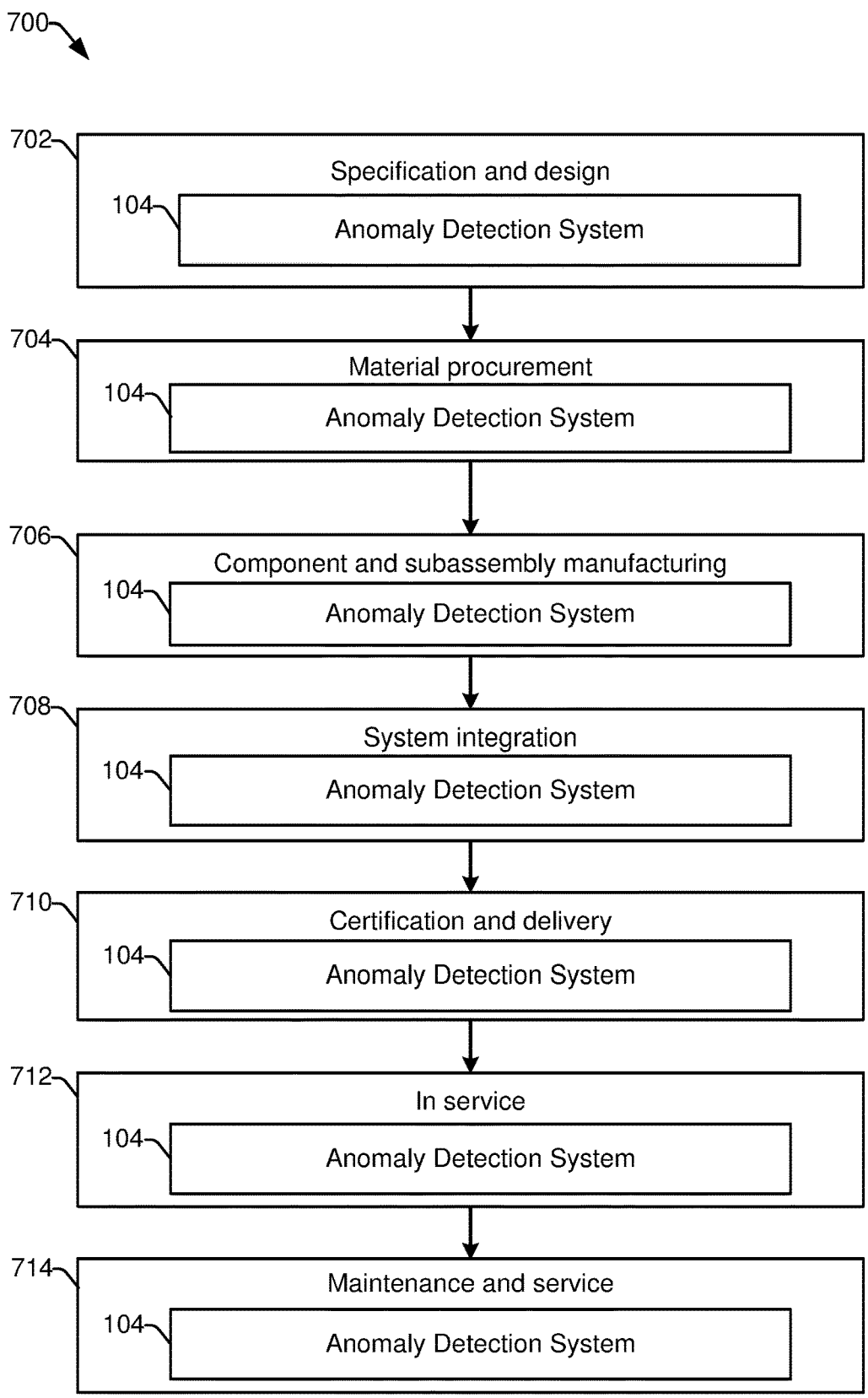
FIG. 7 is a flow chart of an example of a life cycle of an aircraft that includes the anomaly detection system of FIG. 1.

FIG. 7 is a flow chart of an example of a life cycle 700 of an aircraft that includes the anomaly detection system of FIG. 1. During pre-production, the exemplary life cycle 700 includes, at 702, specification and design of an aircraft, such as the aircraft 102. During specification and design of the aircraft, the life cycle 700 may include specification and design of the anomaly detection system 104. At 704, the life cycle 700 also includes material procurement, which may include procuring materials for the anomaly detection system 104.

During production, the life cycle 700 includes, at 706, component and subassembly manufacturing and, at 708, system integration of the aircraft. For example, the life cycle 700 may include component and subassembly manufacturing of the anomaly detection system 104 and system integration of the anomaly detection system 104. At 710, the life cycle 700 includes certification and delivery of the aircraft and, at 712, placing the aircraft in service. Certification and delivery may include certification of the anomaly detection system 104 to place the anomaly detection system 104 in service. While in service by a customer, the aircraft may be scheduled for routine maintenance and service (which may also include modification, reconfiguration, refurbishment, and so on). At 714, the life cycle 700 includes performing maintenance and service on the aircraft, which may include performing maintenance and service on the anomaly detection system 104. Alternatively, the maintenance and service can be performed on the aircraft based on an operational anomaly detected by the anomaly detection system 104.

Each of the processes of the life cycle 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 8:
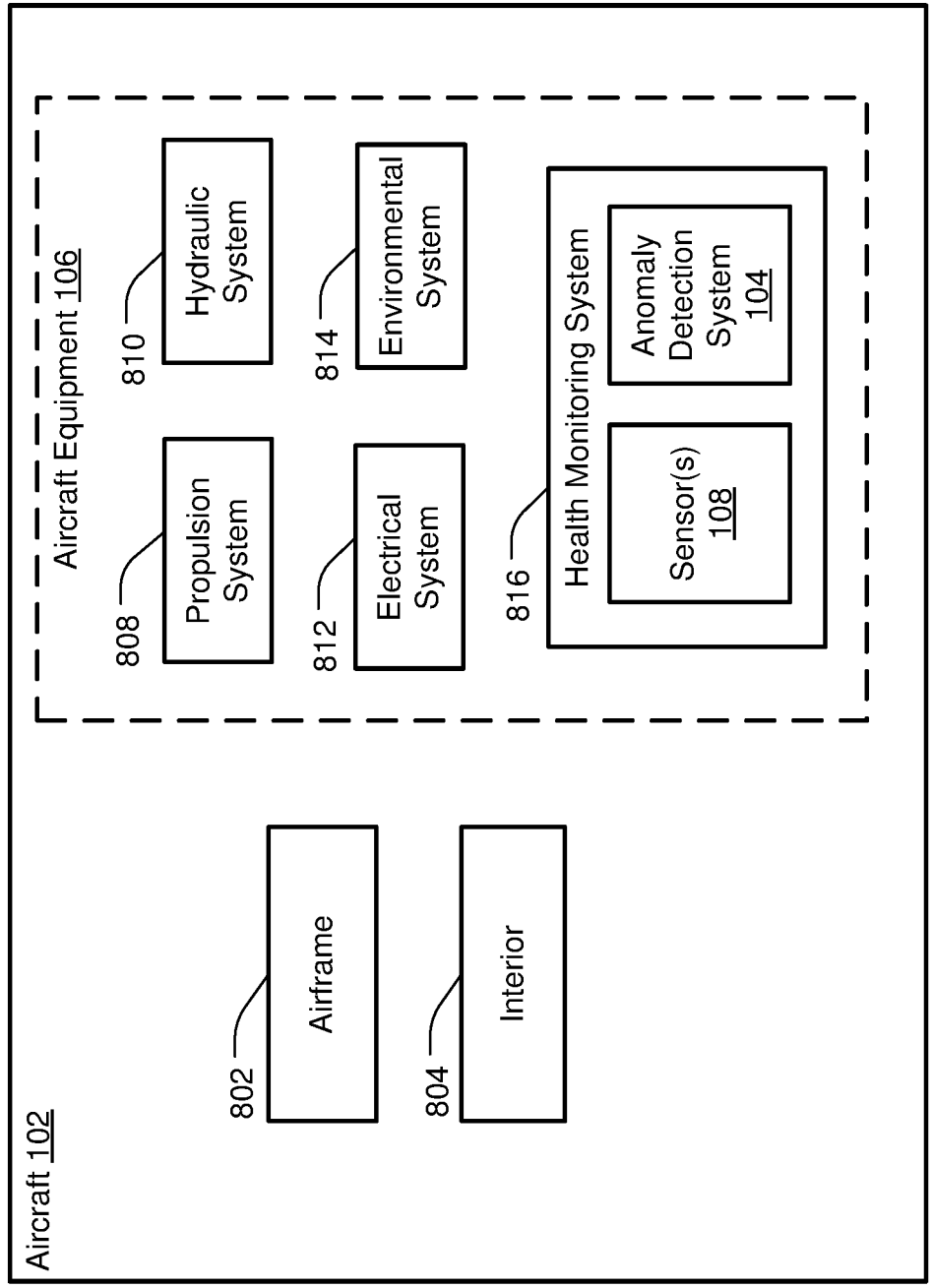
FIG. 8 is a block diagram of an aircraft that includes the anomaly detection system of FIG. 1.

FIG. 8 is a block diagram of the aircraft 102. In the example illustrated in FIG. 8, the anomaly detection system of FIG. 1 is a component of the aircraft 102. In the FIG. 8, the aircraft 102 includes an airframe 802 with a plurality of systems, such as the aircraft equipment 106 and an interior 804. Examples of the aircraft equipment 106 include one or more components of a propulsion system 808, an electrical system 812, an environmental system 814, a hydraulic system 810, and a health monitoring system 816. In the example illustrated in FIG. 8, the sensor(s) 108, the anomaly detection system 104, or both, are part of the health monitoring system 816. Any number of other systems or other equipment may also be included.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
obtaining, at a computing device, sensor data captured by a sensor of an aircraft during a power up event, wherein the sensor data includes multiple parameter values, and wherein each parameter value corresponds to a respective sample period during the power up event;
determining, by the computing device, a set of delta values, wherein each delta value from the set of delta values indicates a difference between a first parameter value and a second parameter value from a pair of parameter values corresponding to consecutive sample periods of the sensor data;
determining, by the computing device, a set of quantized delta values by assigning delta values from the set of delta values to quantization bins based on magnitudes of the delta values;
determining, by the computing device, a normalized count of delta values for each of the quantization bins by:
determining a power up duration of the power up event represented by the sensor data;
determining a normalization factor based on the power up duration of the power up event and based on a normalization standard;
determining a count of delta values assigned to each quantization bin; and
adjusting the count of delta values assigned to each quantization bin based on the normalization factor to determine the normalized count of delta values;
performing, by the computing device, a comparison of the normalized count of delta values for a particular quantization bin to an anomaly detection threshold of the particular quantization bin; and
generating, by the computing device and based on the comparison, an output indicating whether the sensor data is indicative of an operational anomaly for aircraft equipment associated with the sensor.

2. The method of claim 1, further comprising comparing, by the computing device, each delta value to a difference threshold, wherein only delta values that satisfy the difference threshold are assigned to quantization bins.

3. The method of claim 1, wherein the normalization standard indicates a benchmark duration of a standardized power up event.

4. The method of claim 1, further comprising selecting the anomaly detection threshold for each quantization bin based on an operating condition associated with the power up event.

5. The method of claim 4, wherein the aircraft equipment corresponds to a component of an environmental system, and wherein the operating condition is associated with ambient environmental conditions.

6. The method of claim 1, wherein the anomaly detection threshold for each quantization bin includes a first threshold and a second threshold, and wherein the output includes a first indication responsive to the comparison indicating that a normalized count of delta values associated with the particular quantization bin is greater than or equal to the first threshold associated with the particular quantization bin and less than the second threshold associated with the particular quantization bin.

7. The method of claim 6, wherein the output includes a second indication responsive to the comparison indicating that the normalized count of delta values associated with the particular quantization bin is greater than or equal to the second threshold associated with the particular quantization bin.

8. A non-transitory computer-readable storage medium storing instructions that, when executed by one or more processors, cause the one or more processors to perform operations including:
obtaining sensor data captured by a sensor of an aircraft during a power up event, wherein the sensor data includes multiple parameter values, and wherein each parameter value corresponds to a respective sample period during the power up event;
determining a set of delta values, wherein each delta value from the set of delta values indicates a difference between a first parameter value and a second parameter value from a pair of parameter values corresponding to consecutive sample periods of the sensor data;
determining a set of quantized delta values by assigning delta values from the set of delta values to quantization bins based on magnitudes of the delta values;
determining a normalized count of delta values for each of the quantization bins by:
determining a power up duration of the power up event represented by the sensor data;
determining a normalization factor based on the power up duration of the power up event and based on a normalization standard;
determining a count of delta values assigned to each quantization bin; and
adjusting the count of delta values assigned to each quantization bin based on the normalization factor to determine the normalized count of delta values;
performing a comparison of the normalized count of delta values for a particular quantization bin to an anomaly detection threshold of the particular quantization bin; and
generating, based on the comparison, an output indicating whether the sensor data is indicative of an operational anomaly for aircraft equipment associated with the sensor.

9. The non-transitory computer-readable storage medium of claim 8, wherein the operations further comprise comparing each delta value to a difference threshold, and wherein only delta values that satisfy the difference threshold are assigned to quantization bins.

10. The non-transitory computer-readable storage medium of claim 8, wherein the normalization standard indicates a benchmark duration of a standardized power up event.

11. The non-transitory computer-readable storage medium of claim 8, wherein the operations further comprise selecting the anomaly detection threshold for each quantization bin based on an operating condition associated with the power up event.

12. The non-transitory computer-readable storage medium of claim 8, wherein performing the comparison comprises:
comparing the normalized count of delta values to a first threshold associated with the particular quantization bin and to a second threshold associated with the particular quantization bin, wherein the output includes a first indication responsive to the comparison indicating that the normalized count of delta values associated with the particular quantization bin is greater than or equal to the first threshold and less than the second threshold.

13. The non-transitory computer-readable storage medium of claim 12, wherein the output further includes a second indication responsive to the comparison indicating that the normalized count of delta values is greater than or equal to the second threshold.

14. An aircraft comprising:
a sensor configured to capture sensor data during a power up event, wherein the sensor data includes multiple parameter values, and wherein each parameter value corresponds to a respective sample period during the power up event;
one or more processors; and
a memory device configured to store the sensor data and instructions that are executable by the one or more processors to detect operational anomalies for aircraft equipment associated with the sensor, wherein the instructions, when executed by the one or more processors, cause the one or more processors to perform operations including:
determining a set of delta values, wherein each delta value from the set of delta values indicates a difference between a first parameter value and a second parameter value from a pair of parameter values corresponding to consecutive sample periods of the sensor data;
determining a set of quantized delta values by assigning delta values of the set of delta values to quantization bins based on magnitudes of the delta values;
determining a normalized count of delta values for each of the quantization bins by:
determining a power up duration of the power up event represented by the sensor data;
determining a normalization factor based on the power up duration of the power up event and based on a normalization standard;
determining a count of delta values assigned to each quantization bin; and
adjusting the count of delta values assigned to each quantization bin based on the normalization factor to determine the normalized count of delta values;
performing a comparison of the normalized count of delta values for a particular quantization bin to an anomaly detection threshold of the particular quantization bin; and generating an output indicating, based on the comparison, whether the sensor data is indicative of an operational anomaly for the aircraft equipment.

15. The aircraft of claim 14, further comprising an on-board indicator, wherein the operations further comprise sending the output to the on-board indicator.

16. The aircraft of claim 14, wherein the operations further comprise sending the output to an off-board device.

17. A method of training an anomaly detection system, the method comprising:

obtaining, at a computing device, multiple sets of sensor data captured by on-board sensors of one or more aircraft during a plurality of power up events, wherein each set of sensor data corresponds to a respective power up event of a respective aircraft and includes multiple parameter values, and wherein each parameter value corresponds to a respective sample period during the respective power up event;

determining, by the computing device, a set of delta values from each set of sensor data, wherein each delta value from the set of delta values indicates a difference between a first parameter value and a second parameter value from a pair of parameter values corresponding to consecutive sample periods from the set of sensor data;

determining, by the computing device, a set of quantized delta values by assigning delta values of the set of delta values to quantization bins based on magnitudes of the delta values;

determining, by the computing device, a normalized count of delta values for each of the quantization bins by:

determining, for each respective set of sensor data, a power up duration represented by the respective set of sensor data;

determining a normalization factor for the respective set of sensor data based on the power up duration represented by the respective set of sensor data and based on a normalization standard;

determining a count of delta values assigned to each quantization bin for the respective set of sensor data; and adjusting the count of delta values assigned to each quantization bin for the respective set of sensor data based on the normalization factor to determine the normalized count of delta values for each quantization bin for the respective set of sensor data; and setting an anomaly detection threshold for each quantization bin based on the normalized counts of delta values and fault indication data associated with the one or more aircraft.

18. The method of claim 17, wherein the multiple sets of sensor data include a first set of sensor data associated with a fault condition, and wherein the anomaly detection threshold associated with a particular quantization bin is set further based on a first normalized count of delta values associated with the first set of sensor data.

19. The method of claim 17, further comprising comparing, by the computing device, each delta value to a difference threshold, wherein only delta values that satisfy the difference threshold are assigned to quantization bins.

20. The method of claim 17, wherein the normalization standard indicates a corresponding benchmark number of data samples each sensor of the on-board sensors will send during a standardized power up event.

* * * * *